United States Patent
Kim et al.

(10) Patent No.: US 11,104,789 B2
(45) Date of Patent: Aug. 31, 2021

(54) METHOD FOR PREPARING GRAFT COPOLYMER, GRAFT COPOLYMER AND THERMOPLASTIC RESIN MOLDED ARTICLE

(71) Applicant: LG CHEM, LTD., Seoul (KR)

(72) Inventors: Jong Beom Kim, Daejeon (KR); Joo Byung Chai, Daejeon (KR); Yu Sung Jung, Daejeon (KR); Chang Sull Kim, Daejeon (KR); Eun Seon Park, Daejeon (KR); Tae Young Jeon, Daejeon (KR); Young Min Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 92 days.

(21) Appl. No.: 16/631,812

(22) PCT Filed: Jan. 30, 2019

(86) PCT No.: PCT/KR2019/001304
§ 371 (c)(1),
(2) Date: Jan. 16, 2020

(87) PCT Pub. No.: WO2019/151776
PCT Pub. Date: Aug. 8, 2019

(65) Prior Publication Data
US 2020/0165440 A1    May 28, 2020

(30) Foreign Application Priority Data

Feb. 2, 2018 (KR) .................. 10-2018-0013592
Jan. 29, 2019 (KR) .................. 10-2019-0011180

(51) Int. Cl.
*C08L 51/04* (2006.01)
*C08F 279/04* (2006.01)

(52) U.S. Cl.
CPC ............ *C08L 51/04* (2013.01); *C08F 279/04* (2013.01)

(58) Field of Classification Search
CPC .......... C08L 55/02; C08L 25/12; C08L 51/04; C08F 279/04
See application file for complete search history.

(56) References Cited

U.S. PATENT DOCUMENTS

| | | |
|---|---|---|
| 5,256,733 A | 10/1993 | Fleischer et al. |
| 2003/0040555 A1 | 2/2003 | Sakabe |
| 2006/0167179 A1 | 7/2006 | Lee et al. |
| 2006/0191442 A1* | 8/2006 | He ............... C08L 51/003 106/499 |
| 2020/0362152 A1* | 11/2020 | Wittenberg ............. C08L 25/12 |
| 2021/0147667 A1* | 5/2021 | Schulz ................ C08L 25/12 |
| 2021/0147668 A1* | 5/2021 | Schulz ................ C08K 3/22 |
| 2021/0163653 A1* | 6/2021 | Schulz ................ C08F 285/00 |

FOREIGN PATENT DOCUMENTS

| | | |
|---|---|---|
| EP | 0219090 A2 | 4/1987 |
| EP | 1831306 B1 | 12/2010 |
| JP | H11181230 A | 7/1999 |
| JP | 3648861 B2 | 5/2005 |
| JP | 5283817 B2 | 9/2013 |
| KR | 19950005861 A | 3/1995 |
| KR | 19950018237 A | 7/1995 |
| KR | 20030076475 A | 9/2003 |
| KR | 20160048331 A | 5/2016 |
| KR | 20160064392 A | 6/2016 |

OTHER PUBLICATIONS

Search Report dated May 9, 2019 for PCT Application No. PCT/KR2019/001304.
Search Report dated May 13, 2020 for European Application No. 19747015.6.

* cited by examiner

*Primary Examiner* — Jeffrey C Mullis
(74) *Attorney, Agent, or Firm* — Morgan, Lewis & Bockius LLP (57) ABSTRACT

The present invention relates to a method for preparing a graft copolymer, which includes polymerizing a first conjugated diene-based polymer, a second conjugated diene-based polymer, an aromatic vinyl-based monomer and a vinyl cyan-based monomer, wherein particle size distribution of the first conjugated diene-based polymer is 0.346 to 0.404, and particle size distribution of the second conjugated diene-based polymer is 0.196 to 0.304, a graft copolymer and a thermoplastic resin molded article.

12 Claims, 2 Drawing Sheets

METHOD FOR PREPARING GRAFT COPOLYMER, GRAFT COPOLYMER AND THERMOPLASTIC RESIN MOLDED ARTICLE

CROSS-REFERENCE TO RELATED APPLICATIONS

The present application is a National Phase of International Application No.: PCT/KR2019/001304 filed on Jan. 30, 2019, which claims the benefit of priority based on Korean Patent Application Nos. 10-2018-0013592, filed on Feb. 2, 2018, and 10-2019-0011180, filed on Jan. 29, 2019, the entire contents of which are incorporated herein by reference.

TECHNICAL FIELD

The present invention relates to a method for preparing a graft copolymer, a graft copolymer and a thermoplastic resin molded article, and more particularly, to a method for preparing a graft copolymer, by which a molded article having improved surface characteristics and improved plating and painting properties may be manufactured, a graft copolymer and a thermoplastic resin molded article.

BACKGROUND ART

Generally, in case of an ABS graft copolymer used as a material for plating, a method of controlling the amount of acrylonitrile may be used to improve plating properties. In addition, in order to maintain the shape of an anchor hole during plating etching, a method of increasing a graft ratio or a method including a butadiene rubber polymer having the high gel content is also used. Also, in order to improve adhesion by increasing the number of anchor holes, a method of introducing a small-size butadiene rubbery polymer having a small average particle diameter during the graft reaction may be used.

According to the method using the small-size butadiene rubbery polymer, plating adhesion may be improved, but due to the increase of the amount of the small-size butadiene rubbery polymer, impact strength of a graft copolymer may be decreased, and problems of decreasing a graft ratio and deteriorating flowability may arise.

If a large-size butadiene rubbery polymer having a large average particle diameter is used to increase the graft ratio, impact strength may be improved but surface characteristics and flowability may be decreased and problems of degrading plating properties may arise.

DISCLOSURE OF THE INVENTION

Technical Problem

An object of the present invention is to provide a method for preparing a graft copolymer possibly manufacturing a molded article having improved surface characteristics, and thus, improved plating and painting properties.

In addition, another object of the present invention is to provide a method for preparing a graft copolymer, by which a molded article having a high graft ratio, excellent flowability and mechanical properties, and minimized remaining amount of volatile organic compounds, may be manufactured.

Technical Solution

According to an aspect of the present invention, there is provided a method for preparing a graft copolymer, which includes polymerizing a first conjugated diene-based polymer, a second conjugated diene-based polymer, an aromatic vinyl-based monomer and a vinyl cyan-based monomer, wherein particle size distribution of the first conjugated diene-based polymer is 0.346 to 0.404, and particle size distribution of the second conjugated diene-based polymer is 0.196 to 0.304.

In addition, the present invention provides a graft copolymer, which is prepared by the above-described method and has a graft ratio of 37% or more and a weight average molecular weight of a shell of 75,000 g/mol or more.

In addition, the present invention provides a thermoplastic resin molded article manufactured from a thermoplastic resin composition which includes the above-described graft copolymer; and a copolymer including a unit derived from an aromatic vinyl-based monomer and a unit derived from a vinyl cyan-based monomer, wherein a remaining amount of volatile organic compounds is 1,000 ppm or less.

Advantageous Effects

According to the method for preparing a graft copolymer of the present invention, a molded article having excellent surface characteristics and improved plating and paining properties may be manufactured.

In addition, according to the method for preparing a graft copolymer of the present invention, a molded article having excellent flowability and mechanical properties, and minimized remaining amount of volatile organic compounds may be manufactured.

BEST MODE FOR CARRYING OUT THE INVENTION

Hereinafter, the present invention will be described in more detail to assist the understanding of the present invention.

It will be understood that words or terms used in the specification and claims shall not be interpreted as the meaning defined in commonly used dictionaries. It will be understood that the words or terms should be interpreted as having a meaning that is consistent with their meaning in the technical idea of the invention, based on the principle that an inventor may properly define the meaning of the words to best explain the invention.

The average particle diameter and particle size distribution of the conjugated diene-based polymer may be measured using a dynamic light scattering method, particularly, using a Nicomp 380 equipment (product name, manufacturer: PSS) in the present invention.

The "average particle diameter" or "Dv" referred to in the present disclosure means an arithmetic average particle diameter in particle size distribution measured by the dynamic light scattering method. The arithmetic average particle diameter may be an intensity distribution average particle diameter.

"90% particle diameter" means a particle diameter ($D_{90}$) at position 90% when counting the particle diameter from 0

(minimum)-100% (maximum) in order from a small particle diameter in the particle diameter distribution measured by the measuring method.

"50% particle diameter" means a particle diameter ($D_{50}$) when dividing fragments into two based on a certain particle diameter in the particle size distribution measured by the measuring method and when a greater portion and a smaller portion become equivalent.

"10% particle diameter" means a particle diameter ($D_{10}$) at position 10% when counting the particle diameter from 0 (minimum)-100% (maximum) in order from a small particle diameter in the particle diameter distribution measured by the measuring method.

The measurement method by the dynamic light scattering method, and the computing method of the particle size distribution may be performed by well-known methods in this technical field, and in the present invention, the particle size distribution may be computed by the following Mathematical Formula 1:

Particle size distribution (PSD)=
$[D_{90}-D_{10}]/D_{50}$  [Mathematical Formula 1]

In Mathematical Formula 1,
the definition of $D_{90}$, $D_{50}$, and $D_{10}$ is the same as described above.

In the present invention, the gel content may be measured by coagulating a conjugated diene-based polymer latex using methanol, washing, and drying in a vacuum oven of 60° C. for 24 hours. Then, the lump (specimen) thus obtained is cut using scissors, 1 g thereof is taken and put in 100 g of toluene and stored at room temperature for 48 hours in a dark room, and then, sol and gel are separated. Then, the gel content may be measured by the following Equation.

Gel content (%)=[gel weight/specimen weight]×100

In the present invention, the graft ratio may be obtained by putting 2 g of a graft copolymer powder to 300 ml of acetone, stirring for 24 hours, adding the solution to a ultracentrifuge, separating a supernatant, dropping methanol to the supernatant and obtaining a non-grafted portion, drying the non-grafted portion at 85° C. to obtain a dry material, and weighing a weight, and computing by the following Formula:

Graft ratio (%)=[(amount of grafted copolymer of aromatic vinyl-based monomer and vinyl cyan-based monomer)/(sum of amounts of first and second conjugated diene-based polymers)]×100

* amount of grafted copolymer of aromatic vinyl-based monomer and vinyl cyan-based monomer=(amount of dried material obtained)–(sum of amounts of first and second conjugated diene-based polymers)
*sum of amounts of first and second conjugated diene-based polymers: sum of amounts of theoretically added first and second conjugated diene-based polymers In the present invention, the average molecular weight of the shell of the graft copolymer may be measured by drying the supernatant obtained in the measurement method of the graft ratio in a hot air oven of 50° C., dissolving a dried material in THF to prepare a solution (concentration: 0.1 wt %), and filtering the solution using a 0.1 μm filter, and finally using GPC.

In the present invention, the remaining amount of the volatile organic compounds may be measured using a gas chromatography equipment (product name: GC, manufacturer: Agilent).

In the present invention, the polymerization may be any one selected from the group consisting of suspension polymerization, emulsion polymerization and bulk polymerization, and among them, the emulsion polymerization is preferable.

In the present invention, the derived unit from an aromatic vinyl-based monomer may be a unit derived from an aromatic vinyl-based monomer. The aromatic vinyl-based monomer may be one or more selected from the group consisting of styrene, α-methyl styrene, α-ethyl styrene, and p-methyl styrene, and among them, the styrene is preferable.

In the present invention, the derived unit from a vinyl cyan-based monomer may be a unit derived from a vinyl cyan-based monomer. The vinyl cyan-based monomer may be one or more selected from the group consisting of acrylonitrile, methacrylonitrile, phenylacrylonitrile and α-chloroacrylonitrile, and among them, the acrylonitrile is preferable.

In the present invention, the conjugated diene-based monomer may be one or more selected from the group consisting of 1,3-butadiene, isoprene, chloroprene and piperylene, and among them, the 1,3-butadiene is preferable.

1. Method for Preparing Graft Copolymer

The method for preparing a graft copolymer according to an embodiment of the present invention includes polymerizing a first conjugated diene-based polymer, a second conjugated diene-based polymer, an aromatic vinyl-based monomer and a vinyl cyan-based monomer, wherein the particle size distribution of the first conjugated diene-based polymer is 0.346 to 0.404, and the particle size distribution of the second conjugated diene-based polymer is 0.196 to 0.304.

The particle size distribution of the first conjugated diene-based polymer is 0.346 to 0.404, preferably, 0.35 to 0.4. If the above-described conditions are satisfied, coagulation in the first conjugated diene-based polymer is minimized. In addition, a graft copolymer accomplishing excellent surface characteristics and impact strength may be prepared. If the particle size distribution is less than the above-mentioned range, impact strength is decreased, and if the particle size distribution is greater than the above-mentioned range, surface protrusions are excessively produced.

The first conjugated diene-based polymer has an average particle diameter of 0.2 to 0.4 μm, 0.25 to 0.35 μm or 0.3 to 0.33 μm, and among them, 0.3 to 0.33 μm is preferable. If the above-described conditions are satisfied, the coagulation in the first conjugated diene-based polymer may be minimized and impact strength and flowability may be improved.

The particles included in the first conjugated diene-based polymer may have a standard deviation of 0.3 to 0.4 or 0.33 to 0.38, and among them, 0.33 to 0.38 is preferable. If the above-described conditions are satisfied, since the first conjugated diene-based polymer includes particles having relatively diverse particle diameters, a graft copolymer having excellent surface characteristics and impact strength may be prepared.

Meanwhile, the second conjugated diene-based polymer has particle size distribution of 0.196 to 0.304, preferably, 0.2 to 0.3. If the above-described conditions are satisfied, the graft copolymer may achieve excellent impact strength and tensile strength. If the above-described conditions are not satisfied, the impact strength of the graft copolymer may be degraded.

The second conjugated diene-based polymer has an average particle diameter of 0.2 to 0.4 μm, 0.25 to 0.35 μm or 0.28 to 0.30 μm, and among them, 0.28 to 0.30 μm is preferable. If the above-described range is satisfied, the mechanical properties and flowability of the graft copolymer may be even more improved.

The particles included in the second conjugated diene-based polymer may have a standard deviation of 0.2 to 0.29 or 0.24 to 0.26, and among them, 0.24 to 0.26 is preferable. If the above-described conditions are satisfied, since the second conjugated diene-based polymer includes particles having uniform particle diameters, a graft copolymer having excellent impact strength may be prepared.

Meanwhile, the first conjugated diene-based polymer and the second conjugated diene-based polymer may be prepared by 1) a preparation method by which a conjugated diene-based monomer is polymerized and enlargement is not performed, or 2) a preparation method by which a conjugated diene-based monomer is polymerized to prepare a small-size conjugated diene-based polymer, and enlarging the small-size conjugated diene-based polymer.

In Step 2), the average particle diameter of the small-size conjugated diene-based polymer may be 0.05 to 0.15 μm, or 0.08 to 0.12 μm, and among them, 0.08 to 0.12 μm is preferable. If the above-described conditions are satisfied, the preparation of the first and second conjugated diene-based polymers may be easy.

The gel content of the small-size conjugated diene-based polymer may be 90% or more, 90% to 95%, or 90% to 94%, and among them, 92% to 94% is preferable. If the above-described conditions are satisfied, excellent impact strength may be accomplished.

Meanwhile, the enlargement during preparing the first and second conjugated diene-based polymers may be performed once or more times, and the enlargement may be performed by adding a coagulant to the small-size conjugated diene-based polymer. The coagulant may be acetic acid or phosphoric acid.

The coagulant may be added during preparing the first conjugated diene-based polymer in 2.75 to 3.75 parts by weight or 3 to 3.5 parts by weight with respect to 100 parts by weight of the small-size conjugated diene-based polymer, and among them, addition of 3 to 3.5 parts by weight is preferable. If the above-described range is satisfied, a conjugated diene-based polymer satisfying the particle size distribution and average particle diameter of the first conjugated diene-based polymer may be prepared.

If the enlargement is performed in twice during preparing the first conjugated diene-based polymer and the total addition amount of the coagulant is 3 parts by weight with respect to 100 parts by weight of the small-size conjugated diene-based polymer, a weight ratio of the coagulant added in the first and second enlargements may be 85:15 to 95:5 or 87:13 to 93:7, and among them, 87:13 to 93:7 is preferable. In addition, if the total addition amount of the coagulant is 3.5 parts by weight with respect to 100 parts by weight of the small-size conjugated diene-based polymer, the weight ratio of the coagulant added during the first and second enlargements may be 65:35 to 80:20 or 70:30 to 75:25, and among them, 70:30 to 75:25 is preferable. If the above-described range is satisfied, flowability may be improved, and excellent impact strength may be accomplished.

Meanwhile, the coagulant may be added in 2 to 2.73 parts by weight or 2.5 to 2.7 parts by weight with respect to 100 parts by weight of the small-size conjugated diene-based polymer during preparing the second conjugated diene-based polymer, and among them, addition of 2.5 to 2.7 parts by weight is preferable. If the above-described range is satisfied, a conjugated diene-based polymer satisfying the particle size distribution and average particle diameter of the second conjugated diene-based polymer may be prepared.

If the enlargement is performed in twice during preparing the second conjugated diene-based polymer and the total addition amount of the coagulant is 2.5 parts by weight with respect to 100 parts by weight of the small-size conjugated diene-based polymer, a weight ratio of the coagulant added in the first and second enlargements may be 90:10 to 99:1 or 93:7 to 97:3, and among them, 93:7 to 97:3 is preferable. In addition, if the total addition amount of the coagulant is 2.7 parts by weight with respect to 100 parts by weight of the small-size conjugated diene-based polymer, the weight ratio of the coagulant added during the first and second enlargements may be 85:15 to 95:5 or 87:13 to 93:17, and among them, 87:13 to 93:7 is preferable. If the above-described range is satisfied, flowability may be improved, and excellent impact strength may be accomplished.

Meanwhile, if the second conjugated diene-based polymer is prepared by the 1) preparation method, the second conjugated diene-based polymer may be prepared by a known method, and in order to satisfy the particle size distribution and average particle diameter, the amounts of an emulsifier or an electrolyte may be suitably controlled in the known method.

The emulsifier may be one or more selected from the group consisting of a rosin acid alkali metal salt, a fatty acid alkali metal salt and a fatty acid dimer alkali metal salt, and among them, the fatty acid dimer alkali metal salt is preferable.

The rosin acid alkali metal salt may be one or more selected from the group consisting of potassium rosinate and sodium rosinate, and among them, the potassium rosinate is preferable.

The fatty acid alkali metal salt may be a fatty acid alkali metal salt of $C_8$ to $C_{20}$, and one or more selected from the group consisting of an alkali metal salt of capric acid, an alkali metal salt of lauric acid, an alkali metal salt of palmitic acid, an alkali metal salt of stearic acid, an alkali metal salt of oleic acid and an alkali metal salt of linoleic acid, are more preferable.

The fatty acid dimer alkali metal salt may be a fatty acid dimer alkali metal salt of $C_8$ to $C_{20}$, may preferably be a fatty acid dimer potassium salt of $C_8$ to $C_{20}$, and may more preferably be an oleic acid dimer potassium salt.

The emulsifier may be added in 0.3 to 3.0 parts by weight or 0.5 to 2.5 parts by weight with respect to 100 parts by weight of the conjugated diene-based monomer, and among them, addition of 0.5 to 2.5 parts by weight is preferable. If the above-described range is satisfied, polymerization stability may become excellent and a polymerization conversion ratio may be increased.

The electrolyte may be one or more selected from the group consisting of KCl, NaCl, $KHCO_3$, $NaHCO_3$, $K_2CO_3$, $Na_2CO_3$, $KHSO_3$, $NaHSO_3$, $K_4P_2O_7$, $K_3PO_4$, $Na_3PO_4$ and $Na_2HPO_4$, and among them, one or more selected from the group consisting of $K_2CO_3$ and $Na_2CO_3$, is preferable.

The electrolyte may be added in 0.1 to 1 parts by weight or 0.2 to 0.5 parts by weight with respect to 100 parts by weight of the conjugated diene-based monomer, and among them, addition of 0.2 to 0.5 parts by weight is preferable. If the above-described range is satisfied, polymerization stability becomes excellent and a polymerization conversion ratio may be increased.

Meanwhile, the weight ratio of the first conjugated diene-based polymer and the second conjugated diene-based polymer may be 30:70 to 80:20, 50:50 to 80:20, 60:40 to 75:25 or 65:35 to 70:30, and among them, 65:35 to 70:30 is preferable. If the above-described range is satisfied, the production of protrusions at the surface is minimized, and a molded article having excellent surface characteristics may be manufactured, and thus, a molded article having excellent painting and plating properties may be manufactured. In addition, a graft copolymer having a high graft ratio and improved impact strength and flowability may be prepared.

The total amount of the first conjugated diene-based polymer and the second conjugated diene-based polymer may be 50 to 65 wt % or 55 to 60 wt % with respect to the total weight of the first conjugated diene-based polymer, the second conjugated diene-based polymer, the aromatic vinyl-based monomer and the vinyl cyan-based monomer, and among them, 55 to 60 wt % is preferable. If the above-described range is satisfied, the generation of a coagulant during polymerization may be minimized, and the impact strength of the graft copolymer may be even further improved.

The first conjugated diene-based polymer and the second conjugated diene-based polymer may have a latex type, which are dispersed in water in a colloidal state, and may be added to a reactor prior to initiating polymerization.

The total amount of the aromatic vinyl-based monomer and the vinyl cyan-based monomer may be 35 to 50 wt % or 40 to 45 wt % with respect to the total weight of the first conjugated diene-based polymer, the second conjugated diene-based polymer, the aromatic vinyl-based monomer and the vinyl cyan-based monomer, and among them, 40 to 45 wt % is preferable. If the above-described range is satisfied, the chemical resistance, rigidity, impact strength, processability and surface gloss of the graft copolymer may be even more improved.

The weight ratio of the aromatic vinyl-based monomer and the vinyl cyan-based monomer may be 80:20 to 65:35 or 75:25 to 70:30, and among them, 75:25 to 70:30 is preferable. If the above-described range is satisfied, a polymerization conversion ratio may be increased, and polymerization stability and latex stability may be improved even further.

The aromatic vinyl-based monomer and the vinyl cyan-based monomer may be emulsion polymerized while being continuously added in a constant rate to a reactor where the first and second conjugated diene-based polymers are present. If the aromatic vinyl-based monomer and the vinyl cyan-based monomer are continuously added, the heat of reaction produced during polymerization may be dispersed.

During the polymerization, one or more selected from the group consisting of a molecular weight adjusting agent, an initiator, an emulsifier, a redox-based catalyst and water may be further added to the reactor.

The molecular weight adjusting agent may include a mercaptan compound which has large reactivity and a fast decomposition rate, and a large aromatic vinyl-based dimer which has small reactivity and a slow decomposition rate.

The mercaptan compound may be one or more selected from the group consisting of t-dodecyl mercaptan, n-dodecyl mercaptan and octyl mercaptan, and among them, the t-dodecyl mercaptan is preferable.

The aromatic vinyl-based dimer may be one or more selected from the group consisting of an α-methyl styrene dimer, an ethyl styrene dimer and a propyl styrene dimer, and among them, the α-methyl styrene dimer is preferable.

The molecular weight adjusting agent may be 0.30 to 0.50 parts by weight or 0.35 to 0.45 parts by weight with respect to total 100 parts by weight of the first conjugated diene-based polymer, the second conjugated diene-based polymer, the aromatic vinyl-based monomer and the vinyl cyan-based monomer, and among them, 0.35 to 0.45 parts by weight is preferable. If the above-described range is satisfied, the weight average molecular weight of a shell may be suitable maintained and the impact strength of the graft copolymer may be improved even further.

The mercaptan compound and the aromatic vinyl-based dimer may be added in a weight ratio of 60:40 to 70:30 or 65:35 to 70:30, and among them, addition in a weight ratio of 65:35 to 70:30 is preferable. If the above-described conditions are satisfied, the mercaptan compound and the aromatic vinyl-based dimer may control the graft ratio of the graft copolymer, and falling sphere impact strength and notched izod impact strength may be increased.

The initiator may be one or more selected from the group consisting of potassium persulfate, sodium persulfate, ammonium persulfate, cumene hydroperoxide, diisopropyl benzene hydroperoxide, azobisisobutyronitrile, t-butyl hydroperoxide, paramentane hydroperoxide and benzoylperoxide, and among them the t-butyl hydroperoxide is preferable.

The initiator may be added in 0.5 to 0.8 parts by weight, or 0.6 to 0.7 parts by weight with respect to total 100 parts by weight of the first conjugated diene-based polymer, the second conjugated diene-based polymer, the aromatic vinyl-based monomer and the vinyl cyan-based monomer, and among them, addition of 0.6 to 0.7 parts by weight is preferable. If the above-described range is satisfied, latex stability may be excellent, emulsion polymerization may be easily performed, and the remaining amount in the graft copolymer may be minimized.

The emulsifier may be one or more selected from the group consisting of a monocarboxylate of $C_1$ to $C_{20}$, a metal succinate of $C_{12}$ to $C_{18}$, a metal sulfonate and a rosin acid alkali metal salt.

The monocarboxylate may be a fatty acid soap of $C_8$ to $C_{20}$.

The metal succinate of $C_{12}$ to $C_{18}$ may be a dipotassium alkenyl succinate of $C_{12}$ to $C_{18}$.

The metal sulfonate may be one or more selected from the group consisting of sodium dodecyl sulfate, sodium lauryl sulfate, sodium dodecyl benzene sulfate, sodium octadecyl sulfate, sodium oleic sulfate, potassium dodecyl sulfate and potassium octadecyl sulfate.

The rosin acid alkali metal salt may be one or more selected from the group consisting of potassium rosinate and sodium rosinate.

The emulsifier is preferably a rosin acid alkali metal salt, and potassium rosinate is more preferable.

The emulsifier may be added in 0.5 to 1.2 parts by weight, or 0.8 to 1.0 parts by weight with respect to total 100 parts by weight of the first conjugated diene-based polymer, the second conjugated diene-based polymer, the aromatic vinyl-based monomer and the vinyl cyan-based monomer, and among them, addition of 0.8 to 1.0 parts by weight is preferable. If the above-described range is satisfied, emulsion polymerization may be easily performed, and the remaining amount in the graft copolymer may be minimized.

The redox-based catalyst may be one or more selected from the group consisting of sodium formaldehyde sulfoxylate, sodium ethylenediamine tetraacetate, ferrous sulfate, dextrose, sodium pyrophosphate, anhydrous sodium pyrophosphate, and sodium sulfate, and among them, one or more selected from the group consisting of ferrous sulfate, dextrose, sodium pyrophosphate is preferable.

The redox-based catalyst may be added in 0.1 to 0.5 parts by weight, or 0.3 to 0.4 parts by weight with respect to total 100 parts by weight of the first conjugated diene-based polymer, the second conjugated diene-based polymer, the aromatic vinyl-based monomer and the vinyl cyan-based monomer, and among them, addition of 0.3 to 0.4 parts by weight is preferable. If the above-described range is satisfied, advantages of increasing a polymerization conversion ratio is achieved.

The water may be ion exchange water.

One or more selected from the group consisting of the molecular weight adjusting agent, the initiator, the emulsifier, the redox-based catalyst and water may be continuously added to a reactor in which the first and second conjugated diene-based polymers are present together with the aromatic vinyl-based monomer and the vinyl cyan-based monomer in a constant rate. With the continuous addition, heat of reaction during polymerization may be dispersed and the removal of heat may be advantageous.

The graft copolymer prepared by the above-described preparation method has a graft ratio of 37% or more, a weight average molecular weight of a shell of 75,000 g/mol or more, preferably, 75,000 to 110,000 g/mol. If the above-described range is satisfied, surface characteristics may become excellent, and plating and painting properties may be even further improved.

2. Thermoplastic Resin Composition

The thermoplastic resin composition according to another embodiment of the present invention includes a graft copolymer prepared by the preparation method according to an embodiment of the present invention; and a copolymer including a unit derived from an aromatic vinyl-based monomer and a unit derived from a vinyl cyan-based monomer.

The copolymer may impart the thermoplastic resin composition with heat resistance, rigidity and processability.

The copolymer may include the unit derived from an aromatic vinyl-based monomer and the unit derived from a vinyl cyan-based monomer in a weight ratio of 85:15 to 70:30 or 80:20 to 75:25, and among them, a weight ratio of 80:20 to 75:25 is preferable. If the above-described range is satisfied, the thermoplastic resin composition may accomplish the balance among heat resistance, impact strength and processability be achieved well.

The weight average molecular weight of the copolymer may be 100,000 to 150,000 g/mol or 120,000 to 140,000 g/mol, and among them, 120,000 to 140,000 g/mol is preferable. If the above-described range is satisfied, the impact strength of the thermoplastic resin composition may be even further improved.

The weight average molecular weight may be measured using tetrahydrofuran (THF) as an eluent through GPC as a relative value with respect to a standard polystyrene (PS) specimen.

The copolymer may be prepared by one or more kinds of methods selected from the group consisting of emulsion polymerization, suspension polymerization and bulk polymerization, and among them, the bulk polymerization is preferable.

The weight ratio of the graft copolymer and the copolymer may be 20:80 to 35:65 or 25:75 to 30:70, and among them, 25:75 to 30:70 is preferable. If the above-described range is satisfied, the chemical resistance, impact strength, thermal stability, coloring properties, fatigue resistance, rigidity and processability of a molded article manufactured from the thermoplastic resin composition may be improved even further.

The thermoplastic resin molded article manufactured using the thermoplastic resin composition has the remaining amount of volatile organic compounds of 1,000 ppm or less. If the above-described conditions are satisfied, a molded article having excellent characteristics of odor may be provided.

Here, the remaining amount of the volatile organic compounds may be measured using a gas chromatography equipment (product name: GC, manufacturer: Agilent).

MODE FOR CARRYING OUT THE INVENTION

Hereinafter, preferred embodiments will be explained in detail so that a person skilled in the art could easily perform the present invention. However, the present invention may be accomplished in various other types and is not limited to the embodiments explained herein.

Preparation Example 1

<Preparation of Small-Size Conjugated Diene-Based Polymer>

To a nitrogen-substituted polymerization reactor, 120 parts by weight of ion-exchange water, 100 parts by weight of 1,3-butadiene, 2 parts by weight of a potassium rosinate as an emulsifier, 0.1 parts by weight of t-dodecyl mercaptan as a molecular weight adjusting agent, and 0.2 parts by weight of $Na_2CO_3$ as an electrolyte were added and sufficiently mixed, and then, the temperature was elevated so that the internal temperature of the reactor reached 50° C. After finishing the temperature elevation, 0.2 parts by weight of potassium persulfate was added in batch as an initiator, and the polymerization was performed for 7 hours. Then, 0.05 parts by weight of t-dodecyl mercaptan as a molecular weight adjusting agent was added, the temperature was elevated to 70° C., and the polymerization was performed for 8 hours. The polymerization was finished to obtain a small-size butadiene rubbery polymer latex (average particle diameter: 0.1 µm, gel content: 98%).

<Preparation of Large-Size Conjugated Diene-Based Polymer>

100 parts by weight (based on the solid content) of the small-size butadiene rubbery polymer latex was added to a reactor, and an aqueous acetic acid solution including 2.4 parts by weight of acetic acid (concentration: 7 wt %) was continuously added in a constant rate for 1 hour while stirring at 30° C. in a rate of 10 rpm, followed by stirring for 25 minutes to perform first enlargement. Then, an aqueous acetic acid solution including 0.6 parts by weight of acetic acid (concentration: 7 wt %) was continuously added in a constant rate for 10 minutes, followed by stirring for 10 minutes to perform second enlargement to prepare a large-size butadiene rubbery polymer A-1. The large-size butadiene rubbery polymer A-1 had particle size distribution of 0.34 and an average particle diameter of 0.3 µm.

Preparation Example 2

<Preparation of Large-Size Conjugated Diene-Based Polymer>

100 parts by weight (based on the solid content) of the small-size butadiene rubbery polymer latex prepared in Preparation Example 1 was added to a reactor, and an aqueous acetic acid solution including 2.7 parts by weight of acetic acid (concentration: 7 wt %) was continuously added in a constant rate for 1 hour while stirring at 30° C. in a rate of 10 rpm, followed by stirring for 25 minutes to perform first enlargement. Then, an aqueous acetic acid solution including 0.3 parts by weight of acetic acid (concentration: 7 wt %) was continuously injected in a constant rate for 10 minutes, followed by stirring for 10 minutes to perform second enlargement to prepare a large-size butadiene rubbery polymer A-2. The large-size butadiene rubbery polymer A-2 had particle size distribution of 0.35 and an average particle diameter of 0.3 µm.

Preparation Example 3

100 parts by weight (based on the solid content) of the small-size butadiene rubbery polymer latex prepared in Preparation Example 1 was added to a reactor, and an aqueous acetic acid solution including 3 parts by weight of acetic acid (concentration: 7 wt %) was added in a constant rate for 1 hour while stirring at 30° C. in a rate of 10 rpm. After finishing the addition, the stirring was stopped and the resultant product was stood for 30 minutes for enlargement to prepare a large-size butadiene rubbery polymer A-3. The large-size butadiene rubbery polymer A-3 had particle size distribution of 0.37 and an average particle diameter of 0.3 µm.

Figure 1:
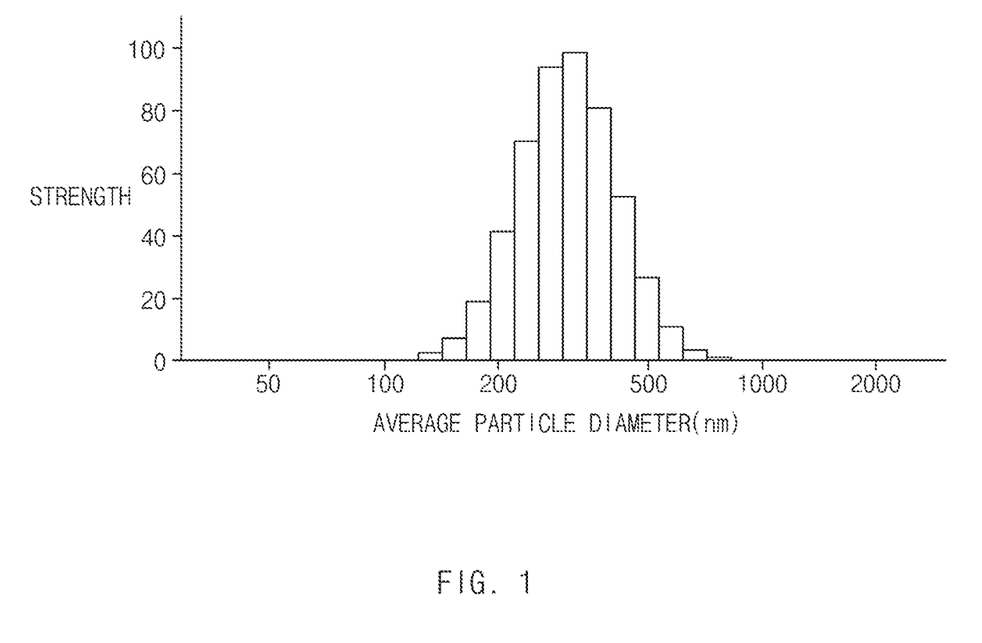
FIG. 1 is a graph showing particle size distribution of a large-size butadiene rubbery polymer of Preparation Example 3.

FIG. 1 shows particle size distribution of the large-size butadiene rubbery polymer latex A-3.

Referring to FIG. 1, it may be found that the large-size butadiene rubbery polymer latex A-3 has wide particle size distribution.

Preparation Example 4

100 parts by weight (based on the solid content) of the small-size butadiene rubbery polymer latex prepared in Preparation Example 1 was added to a reactor, and an aqueous acetic acid solution including 2.45 parts by weight of acetic acid (concentration: 7 wt %) was continuously added in a constant rate for 1 hour while stirring at 30° C. in a rate of 10 rpm, followed by stirring for 25 minutes to perform first enlargement. Then, an aqueous acetic acid solution including 1.05 parts by weight of acetic acid (concentration: 7 wt %) was continuously added in a constant rate for 10 minutes, followed by stirring for 10 minutes to perform second enlargement to prepare a large-size butadiene rubbery polymer latex A-4. The large-size butadiene rubbery polymer latex A-had particle size distribution of 0.4 and an average particle diameter of 0.3 μm.

Preparation Example 5

100 parts by weight (based on the solid content) of the small-size butadiene rubbery polymer latex prepared in Preparation Example 1 was added to a reactor, and an aqueous acetic acid solution including 3.6 parts by weight of acetic acid (concentration: 7 wt %) was continuously added in a constant rate for 1 hour while stirring at 25° C. in a rate of 10 rpm, followed by stirring for 25 minutes to perform first enlargement. Then, an aqueous acetic acid solution including 0.4 parts by weight of acetic acid (concentration: 7 wt %) was continuously added in a constant rate for 10 minutes, followed by stirring for 10 minutes to perform second enlargement to prepare a large-size butadiene rubbery polymer latex A-5. The large-size butadiene rubbery polymer latex A-had particle size distribution of 0.41 and an average particle diameter of 0.3 μm.

Preparation Example 6

100 parts by weight (based on the solid content) of the small-size butadiene rubbery polymer latex prepared in Preparation Example 1 was added to a reactor, and an aqueous acetic acid solution including 2.25 parts by weight of acetic acid (concentration: 7 wt %) was continuously added in a constant rate for 1 hour while stirring at 30° C. in a rate of 10 rpm, followed by stirring for 25 minutes to perform first enlargement. Then, an aqueous acetic acid solution including 0.25 parts by weight of acetic acid (concentration: 7 wt %) was continuously added in a constant rate for 10 minutes, followed by stirring for 10 minutes to perform second enlargement to prepare a large-size butadiene rubbery polymer latex A-6. The large-size butadiene rubbery polymer latex A-had particle size distribution of 0.19 and an average particle diameter of 0.3 μm.

Preparation Example 7

100 parts by weight (based on the solid content) of the small-size butadiene rubbery polymer latex prepared in Preparation Example 1 was added to a reactor, and an aqueous acetic acid solution including 2.375 parts by weight of acetic acid (concentration: 7 wt %) was continuously added in a constant rate for 1 hour while stirring at 30° C. in a rate of 10 rpm, followed by stirring for 25 minutes to perform first enlargement. Then, an aqueous acetic acid solution including 0.125 parts by weight of acetic acid (concentration: 7 wt %) was continuously added in a constant rate for 10 minutes, followed by stirring for 10 minutes to perform second enlargement to prepare a large-size butadiene rubbery polymer latex A-7. The large-size butadiene rubbery polymer latex A-7 had particle size distribution of 0.2 and an average particle diameter of 0.3 μm.

Preparation Example 8

To a nitrogen-substituted polymerization reactor, 100 parts by weight of ion-exchange water, 70 parts by weight of 1,3-butadiene, 1.5 parts by weight of a potassium rosinate as an emulsifier, 0.3 parts by weight of $Na_2CO_3$ as an electrolyte, 0.03 parts by weight of t-dodecyl mercaptan as a molecular weight adjusting agent, and 0.5 parts by weight of potassium persulfate as an initiator were added in batch, and the temperature was elevated to 50° C. to initiate polymerization. At a point when a polymerization conversion ratio was about 35%, 0.7 parts by weight of a potassium rosinate as an emulsifier, 0.5 parts by weight of potassium persulfate and 30 parts by weigh of 1,3-butadiene were added in batch, and polymerization was performed. At a point when a polymerization conversion ratio was about 60%, the temperature was elevated to 75° C., at a point when a polymerization conversion ratio was about 65%, 0.3 parts by weight of a potassium rosinate was added in batch as an emulsifier, and the polymerization was continued. At a point when a polymerization conversion ratio was about 97%, the reaction was finished to prepare a large-size butadiene rubbery polymer latex A-8 having particle size distribution of 0.23 and an average particle diameter of 0.3 μm.

Figure 2:
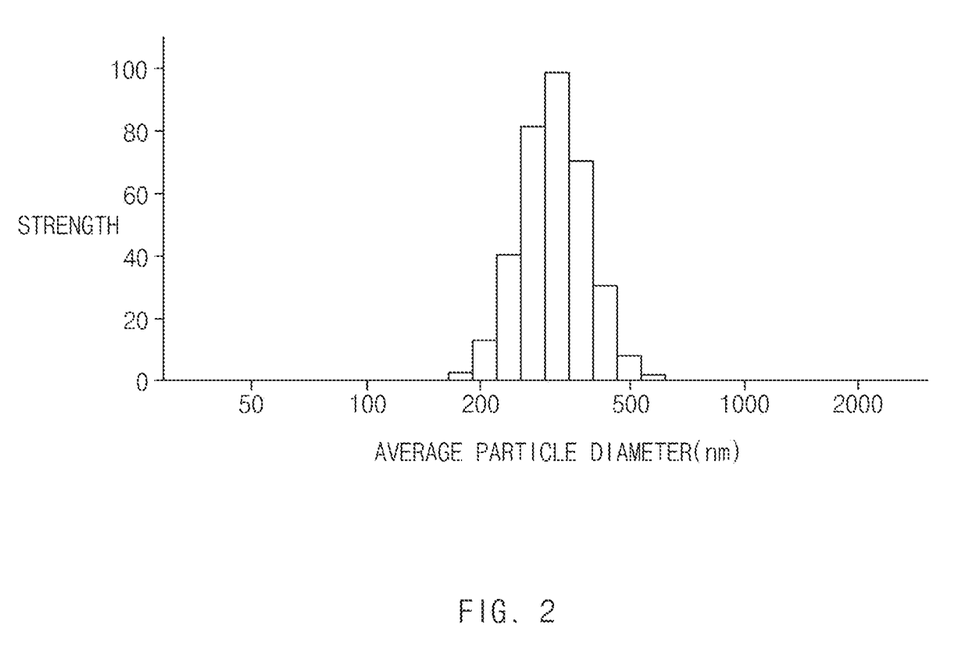
FIG. 2 is a graph showing particle size distribution of a large-size butadiene rubbery polymer of Preparation Example 8.

FIG. 2 shows particle size distribution of the large-size butadiene rubbery polymer latex A-8.

Referring to FIG. 2, it may be found that the large-size butadiene rubbery polymer latex A-8 has narrow particle size distribution.

Preparation Example 9

100 parts by weight (based on the solid content) of the small-size butadiene rubbery polymer latex prepared in Preparation Example 1 was added to a reactor, and an aqueous acetic acid solution including 2.7 parts by weight of acetic acid (concentration: 7 wt %) was continuously added in a constant rate for 1 hour while stirring at 30° C. in a rate of 10 rpm, followed by stirring for 25 minutes to perform first enlargement. Then, an aqueous acetic acid solution including 0.3 parts by weight of acetic acid (concentration: 7 wt %) was continuously added in a constant rate for 10 minutes, followed by stirring for 10 minutes to perform second enlargement to prepare a large-size butadiene rubbery polymer latex A-9. The large-size butadiene rubbery polymer latex A-9 had particle size distribution of 0.3 and an average particle diameter of 0.3 μm.

Preparation Example 10

100 parts by weight (based on the solid content) of the small-size butadiene rubbery polymer latex prepared in Preparation Example 1 was added to a reactor, and an aqueous acetic acid solution including 3.15 parts by weight of acetic acid (concentration: 7 wt %) was continuously added in a constant rate for 1 hour while stirring at 30° C. in a rate of 10 rpm, followed by stirring for 25 minutes to perform first enlargement. Then, an aqueous acetic acid solution including 0.35 parts by weight of acetic acid (concentration: 7 wt %) was continuously added in a constant rate for 10 minutes, followed by stirring for 10 minutes to perform second enlargement to prepare a large-size butadiene rubbery polymer latex A-10. The large-size butadiene rubbery polymer latex A-10 had particle size distribution of 0.31 and an average particle diameter of 0.3 μm.

Hereinafter, the amount and weight ratio of the acetic acid added for preparing each of the large-size butadiene rubbery polymers of the Preparation Examples, and the particle size distribution and average particle diameter of the large-size butadiene rubbery polymer are listed in [Table 1] below.

TABLE 1

| Division | | Preparation Example | | | | | | | | | |
|---|---|---|---|---|---|---|---|---|---|---|---|
| | | 1 | 2 | 3 | 4 | 5 | 6 | 7 | 8 | 9 | 10 |
| Large-size butadiene rubbery polymer | | A-1 | A-2 | A-3 | A-4 | A-5 | A-6 | A-7 | A-8 | A-9 | A-10 |
| Acetic acid (parts by weight) | Total addition amount | 3 | 3 | 3 | 3.5 | 4.0 | 2.5 | 2.5 | — | 2.7 | 3.5 |
| | First enlargement | 2.4 | 2.7 | 3 | 2.45 | 3.6 | 2.25 | 2.375 | — | 0.3 | 3.15 |
| | Second enlargement | 0.6 | 0.3 | — | 1.05 | 0.4 | 0.25 | 0.125 | — | 3 | 0.35 |
| | Weight ratio | 8:2 | 9:1 | — | 7:3 | 9:1 | 9:1 | 95:5 | — | 9:1 | 9:1 |
| Particle size distribution | | 0.34 | 0.35 | 0.37 | 0.4 | 0.41 | 0.19 | 0.2 | 0.23 | 0.3 | 0.31 |
| Average particle diameter | | 0.3 | 0.3 | 0.3 | 0.3 | 0.3 | 0.3 | 0.3 | 0.3 | 0.3 | 0.3 |

Example 1

<Preparation of Graft Copolymer Powder>

A first mixture including 30 parts by weight of styrene, 10 parts by weight of acrylonitrile, 0.6 parts by weight of t-butyl hydroperoxide as an initiator, 1.0 part by weight of a potassium rosinate as an emulsifier, 0.26 parts by weight of t-dodecyl mercaptan as a molecular weight adjusting agent, 0.14 parts by weight of an α-methyl styrene dimer, and 25 parts by weight of ion exchange water was prepared.

In addition, a second mixture including 0.027 parts by weight of dextrose, 0.002 parts by weight of sodium pyrophosphate, and 0.001 parts by weight of ferrous sulfate was prepared.

To a nitrogen-substituted reactor, 36 parts by weight (based on the solid content) of the large-size butadiene rubbery polymer latex A-3, 24 parts by weight (based on the solid content) of the large-size butadiene rubbery polymer latex A-8, and 100 parts by weight of ion exchange water were added.

Then, the first mixture and the second mixture were continuously added to the reactor at 70° C. in a constant rate for 2 hours.

Then, 0.05 parts by weight of dextrose, 0.03 parts by weight of sodium pyrophosphate, 0.001 parts by weight of ferrous sulfate as a redox-based catalyst, and 0.05 parts by weight of t-butyl hydroperoxide as an initiator were added in batch to the reactor, and polymerization was performed while elevating the temperature to 80° C. over 1 hour. Then, the polymerization was finished to prepare a graft copolymer latex. The graft copolymer latex thus obtained was coagulated, aged, washed, dehydrated and dried to obtain a graft copolymer powder B-1.

<Preparation of Thermoplastic Resin Composition>

30 parts by weight of the graft copolymer powder B-1 and 70 parts by weight of 92HR (styrene/acrylonitrile copolymer) of LG Chem, were mixed to prepare a thermoplastic resin composition C-1.

Example 2

<Preparation of Graft Copolymer Powder>

A graft copolymer powder B-2 was prepared by the same method as in Example 1 except for adding 40 parts by weight (based on the solid content) instead of 36 parts by weight (based on the solid content) of the large-size butadiene rubbery polymer latex A-3, and adding 20 parts by weight (based on the solid content) instead of 24 parts by weight (based on the solid content) of the large-size butadiene rubbery polymer latex A-8.

<Thermoplastic Resin Composition>

30 parts by weight of the graft copolymer powder B-2 and 70 parts by weight of 92HR (styrene/acrylonitrile copolymer) of LG Chem, were mixed to prepare a thermoplastic resin composition C-2.

Example 3

<Preparation of Graft Copolymer Powder>

A graft copolymer powder B-3 was prepared by the same method as in Example 1 except for adding 45 parts by weight (based on the solid content) instead of 36 parts by weight (based on the solid content) of the large-size butadiene rubbery polymer latex A-3, and adding 15 parts by weight (based on the solid content) instead of 24 parts by weight (based on the solid content) of the large-size butadiene rubbery polymer latex A-8.

<Thermoplastic Resin Composition>

30 parts by weight of the graft copolymer powder B-3 and 70 parts by weight of 92HR (styrene/acrylonitrile copolymer) of LG Chem, were mixed to prepare a thermoplastic resin composition C-3.

Example 4

<Preparation of Graft Copolymer Powder>

A first mixture including 30 parts by weight of styrene, 10 parts by weight of acrylonitrile, 0.6 parts by weight of t-butyl hydroperoxide as an initiator, 1.0 part by weight of a potassium rosinate as an emulsifier, 0.14 parts by weight of t-dodecyl mercaptan as a molecular weight adjusting agent, 0.26 parts by weight of an α-methyl styrene dimer, and 25 parts by weight of ion exchange water was prepared.

In addition, a second mixture including 0.027 parts by weight of dextrose, 0.002 parts by weight of sodium pyrophosphate, and 0.001 parts by weight of ferrous sulfate was prepared.

To a nitrogen-substituted reactor, 40 parts by weight (based on the solid content) of the large-size butadiene rubbery polymer latex A-3, 20 parts by weight (based on the solid content) of the large-size butadiene rubbery polymer latex A-8, and 100 parts by weight of ion exchange water were added.

Then, the first mixture and the second mixture were continuously added to the reactor at 70° C. in a constant rate for 2 hours.

Then, 0.05 parts by weight of dextrose, 0.03 parts by weight of sodium pyrophosphate, 0.001 parts by weight of ferrous sulfate as a redox-based catalyst, and 0.05 parts by weight of t-butyl hydroperoxide as an initiator were added in batch to the reactor, and polymerization was performed while elevating the temperature to 80° C. over 1 hour. Then, the polymerization was finished to prepare a graft copolymer latex. The graft copolymer latex thus obtained was coagulated, aged, washed, dehydrated and dried to obtain a graft copolymer powder B-4.

<Thermoplastic Resin Composition>

30 parts by weight of the graft copolymer powder B-4 and 70 parts by weight of 92HR (styrene/acrylonitrile copolymer) of LG Chem, were mixed to prepare a thermoplastic resin composition C-4.

Example 5

<Preparation of Graft Copolymer Powder>

A graft copolymer powder B-5 was prepared by the same method as in Example 1 except for adding 20 parts by weight (based on the solid content) instead of 36 parts by weight (based on the solid content) of the large-size butadiene rubbery polymer latex A-3, and adding 40 parts by weight (based on the solid content) instead of 24 parts by weight (based on the solid content) of the large-size butadiene rubbery polymer latex A-8.

<Thermoplastic Resin Composition>

30 parts by weight of the graft copolymer powder B-5 and 70 parts by weight of 92HR (styrene/acrylonitrile copolymer) of LG Chem, were mixed to prepare a thermoplastic resin composition C-5.

Example 6

<Preparation of Graft Copolymer Powder>

A first mixture including 30 parts by weight of styrene, 10 parts by weight of acrylonitrile, 0.6 parts by weight of t-butyl hydroperoxide as an initiator, 1.0 part by weight of a potassium rosinate as an emulsifier, 0.14 parts by weight of t-dodecyl mercaptan as a molecular weight adjusting agent, 0.26 parts by weight of an α-methyl styrene dimer, and 25 parts by weight of ion exchange water was prepared.

In addition, a second mixture including 0.027 parts by weight of dextrose, 0.002 parts by weight of sodium pyrophosphate, and 0.001 parts by weight of ferrous sulfate was prepared.

To a nitrogen-substituted reactor, 20 parts by weight (based on the solid content) of the large-size butadiene rubbery polymer latex A-3, 40 parts by weight (based on the solid content) of the large-size butadiene rubbery polymer latex A-8, and 100 parts by weight of ion exchange water were added.

Then, the first mixture and the second mixture were continuously added to the reactor at 70° C. in a constant rate for 2 hours.

Then, 0.05 parts by weight of dextrose, 0.03 parts by weight of sodium pyrophosphate, 0.001 parts by weight of ferrous sulfate as a redox-based catalyst, and 0.05 parts by weight of t-butyl hydroperoxide as an initiator were added in batch to the reactor, and polymerization was performed while elevating the temperature to 80° C. over 1 hour. Then, the polymerization was finished to prepare a graft copolymer latex. The graft copolymer latex thus obtained was coagulated, aged, washed, dehydrated and dried to obtain a graft copolymer powder B-6.

<Thermoplastic Resin Composition>

30 parts by weight of the graft copolymer powder B-6 and 70 parts by weight of 92HR (styrene/acrylonitrile copolymer) of LG Chem, were mixed to prepare a thermoplastic resin composition C-6.

Example 7

<Preparation of Graft Copolymer Powder>

A graft copolymer powder B-7 was prepared by the same method as in Example 1 except for adding the large-size butadiene rubbery polymer latex A-2 instead of the large-size butadiene rubbery polymer latex A-3.

<Thermoplastic Resin Composition>

30 parts by weight of the graft copolymer powder B-7 and 70 parts by weight of 92HR (styrene/acrylonitrile copolymer) of LG Chem, were mixed to prepare a thermoplastic resin composition C-7.

Example 8

<Preparation of Graft Copolymer Powder>

A graft copolymer powder B-8 was prepared by the same method as in Example 1 except for adding the large-size butadiene rubbery polymer latex A-4 instead of the large-size butadiene rubbery polymer latex A-3.

<Thermoplastic Resin Composition>

30 parts by weight of the graft copolymer powder B-8 and 70 parts by weight of 92HR (styrene/acrylonitrile copolymer) of LG Chem, were mixed to prepare a thermoplastic resin composition C-8.

Example 9

<Preparation of Graft Copolymer Powder>

A graft copolymer powder B-9 was prepared by the same method as in Example 1 except for adding the large-size butadiene rubbery polymer latex A-7 instead of the large-size butadiene rubbery polymer latex A-8.

<Thermoplastic Resin Composition>

30 parts by weight of the graft copolymer powder B-9 and 70 parts by weight of 92HR (styrene/acrylonitrile copolymer) of LG Chem, were mixed to prepare a thermoplastic resin composition C-9.

Example 10

<Preparation of Graft Copolymer Powder>

A graft copolymer powder B-10 was prepared by the same method as in Example 1 except for adding the large-size butadiene rubbery polymer latex A-9 instead of the large-size butadiene rubbery polymer latex A-8.

<Thermoplastic Resin Composition>

30 parts by weight of the graft copolymer powder B-10 and 70 parts by weight of 92HR (styrene/acrylonitrile copolymer) of LG Chem, were mixed to prepare a thermoplastic resin composition C-10.

Example 11

<Preparation of Graft Copolymer Powder>

A graft copolymer powder B-11 was prepared by the same method as in Example 1 except for adding the large-size butadiene rubbery polymer latex A-4 instead of the large-size butadiene rubbery polymer latex A-3, and adding the large-size butadiene rubbery polymer A-9 instead of the large-size butadiene rubbery polymer A-8.

<Thermoplastic Resin Composition>

30 parts by weight of the graft copolymer powder B-11 and 70 parts by weight of 92HR (styrene/acrylonitrile copolymer) of LG Chem, were mixed to prepare a thermoplastic resin composition C-11.

Example 12

<Preparation of Graft Copolymer Powder>

A graft copolymer powder B-12 was prepared by the same method as in Example 1 except for adding 40 parts by weight (based on the solid content) of the large-size butadiene rubbery polymer latex A-4 instead of 36 parts by weight (based on the solid content) of the large-size butadiene rubbery polymer latex A-3, and adding 20 parts by weight (based on the solid content) of the butadiene rubbery polymer A-9 instead of 24 parts by weight of the large-size butadiene rubbery polymer A-8.

<Thermoplastic Resin Composition>

30 parts by weight of the graft copolymer powder B-12 and 70 parts by weight of 92HR (styrene/acrylonitrile copolymer) of LG Chem, were mixed to prepare a thermoplastic resin composition C-12.

Comparative Example 1

<Preparation of Graft Copolymer Powder>

A first mixture including 30 parts by weight of styrene, 10 parts by weight of acrylonitrile, 0.6 parts by weight of t-butyl hydroperoxide as an initiator, 1.0 part by weight of a potassium rosinate as an emulsifier, 0.4 parts by weight of t-dodecyl mercaptan as a molecular weight adjusting agent, and 25 parts by weight of ion exchange water was prepared.

In addition, a second mixture including 0.027 parts by weight of dextrose, 0.002 parts by weight of sodium pyrophosphate, and 0.001 parts by weight of ferrous sulfate was prepared.

To a nitrogen-substituted reactor, 60 parts by weight (based on the solid content) of the large-size butadiene rubbery polymer latex A-3 and 100 parts by weight of ion exchange water were added.

Then, the first mixture and the second mixture were continuously added to the reactor at 70° C. in a constant rate for 2 hours.

Then, 0.05 parts by weight of dextrose, 0.03 parts by weight of sodium pyrophosphate, 0.001 parts by weight of ferrous sulfate as a redox-based catalyst, and 0.05 parts by weight of t-butyl hydroperoxide as an initiator were added in batch to the reactor, and polymerization was performed while elevating the temperature to 80° C. over 1 hour. Then, the polymerization was finished to prepare a graft copolymer latex. The graft copolymer latex thus obtained was coagulated, aged, washed, dehydrated and dried to obtain a graft copolymer powder B-13.

<Thermoplastic Resin Composition>

30 parts by weight of the graft copolymer powder B-13 and 70 parts by weight of 92HR (styrene/acrylonitrile copolymer) of LG Chem, were mixed to prepare a thermoplastic resin composition.

Comparative Example 2

<Preparation of Graft Copolymer Powder>

A first mixture including 30 parts by weight of styrene, 10 parts by weight of acrylonitrile, 0.6 parts by weight of t-butyl hydroperoxide as an initiator, 1.0 part by weight of a potassium rosinate as an emulsifier, 0.4 parts by weight of an α-methyl styrene dimer as a molecular weight adjusting agent, and 25 parts by weight of ion exchange water was prepared.

In addition, a second mixture including 0.027 parts by weight of dextrose, 0.002 parts by weight of sodium pyrophosphate, and 0.001 parts by weight of ferrous sulfate was prepared.

To a nitrogen-substituted reactor, 60 parts by weight (based on the solid content) of the large-size butadiene rubbery polymer latex A-3 and 100 parts by weight of ion exchange water were added.

Then, the first mixture and the second mixture were continuously added to the reactor at 70° C. in a constant rate for 2 hours.

Then, 0.05 parts by weight of dextrose, 0.03 parts by weight of sodium pyrophosphate, 0.001 parts by weight of ferrous sulfate as a redox-based catalyst, and 0.05 parts by weight of t-butyl hydroperoxide as an initiator were added in batch to the reactor, and polymerization was performed while elevating the temperature to 80° C. over 1 hour. Then, the polymerization was finished to prepare a graft copolymer latex. The graft copolymer latex thus obtained was coagulated, aged, washed, dehydrated and dried to obtain a graft copolymer powder B-14.

<Thermoplastic Resin Composition>

30 parts by weight of the graft copolymer powder B-14 and 70 parts by weight of 92HR (styrene/acrylonitrile copolymer) of LG Chem, were mixed to prepare a thermoplastic resin composition C-14.

Comparative Example 3

<Preparation of Graft Copolymer Powder>

A first mixture including 30 parts by weight of styrene, 10 parts by weight of acrylonitrile, 0.6 parts by weight of t-butyl hydroperoxide as an initiator, 1.0 part by weight of a potassium rosinate as an emulsifier, 0.4 parts by weight of t-dodecyl mercaptan as a molecular weight adjusting agent, and 25 parts by weight of ion exchange water was prepared.

In addition, a second mixture including 0.027 parts by weight of dextrose, 0.002 parts by weight of sodium pyrophosphate, and 0.001 parts by weight of ferrous sulfate was prepared.

To a nitrogen-substituted reactor, 60 parts by weight (based on the solid content) of the large-size butadiene rubbery polymer latex A-8, and 100 parts by weight of ion exchange water were sffed.

Then, the first mixture and the second mixture were continuously added to the reactor at 70° C. in a constant rate for 2 hours.

Then, 0.05 parts by weight of dextrose, 0.03 parts by weight of sodium pyrophosphate, 0.001 parts by weight of ferrous sulfate as a redox-based catalyst, and 0.05 parts by weight of t-butyl hydroperoxide as an initiator were added in batch to the reactor, and polymerization was performed while elevating the temperature to 80° C. over 1 hour. Then, the polymerization was finished to prepare a graft copolymer latex. The graft copolymer latex thus obtained was coagulated, aged, washed, dehydrated and dried to obtain a graft copolymer powder B-15.

<Thermoplastic Resin Composition>

30 parts by weight of the graft copolymer powder B-15 and 70 parts by weight of 92HR (styrene/acrylonitrile copolymer) of LG Chem, were mixed to prepare a thermoplastic resin composition C-15.

Comparative Example 4

<Preparation of Graft Copolymer Powder>

A first mixture including 30 parts by weight of styrene, 10 parts by weight of acrylonitrile, 0.6 parts by weight of t-butyl hydroperoxide as an initiator, 1.0 part by weight of a potassium rosinate as an emulsifier, 0.4 parts by weight of an α-methyl styrene dimer as a molecular weight adjusting agent, and 25 parts by weight of ion exchange water was prepared.

In addition, a second mixture including 0.027 parts by weight of dextrose, 0.002 parts by weight of sodium pyrophosphate, and 0.001 parts by weight of ferrous sulfate was prepared.

To a nitrogen-substituted reactor, 60 parts by weight (based on the solid content) of a large-size butadiene rubbery polymer latex A-8 and 100 parts by weight of ion exchange water were added.

Then, the first mixture and the second mixture were continuously added to the reactor at 70° C. in a constant rate for 2 hours.

Then, 0.05 parts by weight of dextrose, 0.03 parts by weight of sodium pyrophosphate, 0.001 parts by weight of ferrous sulfate as a redox-based catalyst, and 0.05 parts by weight of t-butyl hydroperoxide as an initiator were added in batch to the reactor, and polymerization was performed while elevating the temperature to 80° C. over 1 hour. Then, the polymerization was finished to prepare a graft copolymer latex. The graft copolymer latex thus obtained was coagulated, aged, washed, dehydrated and dried to obtain a graft copolymer powder B-16.

<Thermoplastic Resin Composition>

30 parts by weight of the graft copolymer powder B-16 and 70 parts by weight of 92HR (styrene/acrylonitrile copolymer) of LG Chem, were mixed to prepare a thermoplastic resin composition C-16.

Comparative Example 5

<Preparation of Graft Copolymer Powder>

A graft copolymer powder B-7 was prepared by the same method as in Example 1 except for adding the large-size butadiene rubbery polymer latex A-1 instead of the large-size butadiene rubbery polymer latex A-3.

<Thermoplastic Resin Composition>

30 parts by weight of the graft copolymer powder B-17 and 70 parts by weight of 92HR (styrene/acrylonitrile copolymer) of LG Chem, were mixed to prepare a thermoplastic resin composition C-17.

Comparative Example 6

<Preparation of Graft Copolymer Powder>

A graft copolymer powder B-18 was prepared by the same method as in Example 1 except for adding the butadiene rubbery polymer latex A-5 instead of the large-size butadiene rubbery polymer latex A-3.

<Thermoplastic Resin Composition>

30 parts by weight of the graft copolymer powder B-18 and 70 parts by weight of 92HR (styrene/acrylonitrile copolymer) of LG Chem, were mixed to prepare a thermoplastic resin composition C-18.

Comparative Example 7

<Preparation of Graft Copolymer Powder>

A graft copolymer powder B-19 was prepared by the same method as in Example 1 except for adding the butadiene rubbery polymer latex A-6 instead of the large-size butadiene rubbery polymer latex A-8.

<Thermoplastic Resin Composition>

30 parts by weight of the graft copolymer powder B-19 and 70 parts by weight of 92HR (styrene/acrylonitrile copolymer) of LG Chem, were mixed to prepare a thermoplastic resin composition C-19.

Comparative Example 8

<Preparation of Graft Copolymer Powder>

A graft copolymer powder B-20 was prepared by the same method as in Example 1 except for adding the butadiene rubbery polymer latex A-10 instead of the butadiene rubbery polymer latex A-8.

<Thermoplastic Resin Composition>

30 parts by weight of the graft copolymer powder B-20 and 70 parts by weight of 92HR (styrene/acrylonitrile copolymer) of LG Chem, were mixed to prepare a thermoplastic resin composition C-20.

Experimental Example 1

The polymerization conversion ratios, graft ratios and weight average molecular weights of the graft copolymers of the Examples and the Comparative Examples were measured and listed in [Table 2] to [Table 5] below.

(1) Polymerization conversion ratio (%): 2 g of a graft copolymer latex was dried in a hot air drier for 15 minutes, and the weight was measured to obtain the total solid content (TSC), and the polymerization conversion ratio was computed using the following equation:

Polymerization conversion ratio (%)=[total solid content (TSC)×(parts by weight of monomers and supplementary materials added)/100]−(parts by weight of supplementary materials added other than monomers)

(2) Graft ratio (%): 2 g of a graft copolymer powder was put in 300 ml of acetone and stirred for 24 hours. This solution was added to an ultracentrifuge, and a supernatant was separated. Methanol was dropped to the supernatant to obtain a non-grafted part and this non-grafted part was dried at 85° C. to obtain a dried material. Then, the amount of the dried material was measured and the graft ratio was computed according to the following equation:

Graft ratio (%)=[(amount of grafted SAN copolymer)/(sum of amount of large-size butadiene rubbery polymer)]×100 amount of grafted SAN copolymer=(amount of dried material obtained)−(sum of amounts of large-size butadiene rubbery polymers)

sum of amount of large-size butadiene rubbery polymer: the solid content of large-size butadiene rubbery polymer added theoretically (3) Weight average molecular weight of shell (g/mol): the supernatant obtained in the measurement method of the graft ratio was dried in a hot air oven of 50° C. Then, the dried material was dissolved in THF to prepare a solution (concentration: 0.1 wt %), and this solution was filtered through a filter of 0.1 μm, and finally the weight average molecular weight of shell was measured using GPC.

Experimental Example 2

The thermoplastic resin compositions of the Examples and the Comparative Examples were added to a twin-screw extruder set to 210° C. and extruded to prepare pellets. The physical properties of the pellets were measured by the methods below, and the results are listed in [Table 2] to [Table 5] below.

(1) Melt Flow index (g/10 min): measured based on ASTM D1238.

(2) Remaining amount of volatile organic compounds (ppm): the remaining amount of the volatile organic compounds was measured using a gas chromatography equipment (product name: GC, manufacturer: Agilent).

Experimental Example 3

A specimen was manufactured by injection molding the pellet prepared in Experimental Example 1, and the physical properties thereof were measured by the methods below. The results are listed in [Table 2] to [Table 5] below.

(1) Number of surface protrusions: the specimen was manufactured into a film sheet, and the number of protrusions which had a size of 0.3 μm or more per 1 m$^2$ of the sheet was counted.

(2) Falling sphere impact strength (N): measured based on ASTM D3763.

(3) Notched izod impact strength (kgf·cm/cm): measured using a ¼ In specimen based on ASTM 256.

TABLE 2

| Division | | Example | | | | | |
|---|---|---|---|---|---|---|---|
| | | 1 | 2 | 3 | 4 | 5 | 6 |
| Large-size butadiene rubbery polymer (parts by weight) | A-1 | — | — | — | — | — | — |
| | A-2 | — | — | — | — | — | — |
| | A-3 | 36 | 40 | 45 | 40 | 20 | 20 |
| | A-4 | — | — | — | — | — | — |
| | A-5 | — | — | — | — | — | — |
| | A-6 | — | — | — | — | — | — |
| | A-7 | — | — | — | — | — | — |
| | A-8 | 24 | 20 | 15 | 20 | 40 | 40 |
| | A-9 | — | — | — | — | — | — |
| | A-10 | — | — | — | — | — | — |
| Styrene (parts by weight) | | 30 | 30 | 30 | 30 | 30 | 30 |
| Acrylonitrile (parts by weight) | | 10 | 10 | 10 | 10 | 10 | 10 |
| Molecular weight adjusting agent (parts by weight) | t-dodecyl mercaptan | 0.26 | 0.26 | 0.26 | 0.14 | 0.26 | 0.14 |
| | α-methyl styrene dimer | 0.14 | 0.14 | 0.14 | 0.26 | 0.14 | 0.26 |
| Polymerization conversion ratio | | 95 | 97 | 96 | 95 | 96 | 94 |
| Graft ratio | | 39 | 48 | 38 | 40 | 37 | 41 |
| Weight average molecular weight of shell | | 88,000 | 75,000 | 84,000 | 85,000 | 100,000 | 80,000 |
| Flow index | | 7.2 | 7.5 | 7.0 | 6.8 | 6.5 | 6.9 |
| Volatile organic compound remaining amount | | 820 | 700 | 800 | 850 | 900 | 900 |
| Surface protrusion number | | 6 | 3 | 7 | 6 | 7 | 5 |
| Falling sphere impact strength | | 3,900 | 4,300 | 3,800 | 3,800 | 4,400 | 4,000 |
| Notched izod impact strength | | 31 | 33 | 30 | 32 | 31 | 30 |

TABLE 3

| Division | | Example | | | | | |
|---|---|---|---|---|---|---|---|
| | | 7 | 8 | 9 | 10 | 11 | 12 |
| Large-size butadiene rubbery polymer (parts by | A-1 | — | — | — | — | — | — |
| | A-2 | 36 | — | — | — | — | — |
| | A-3 | — | — | 36 | 36 | — | — |
| | A-4 | — | 36 | — | — | 36 | 40 |
| | A-5 | — | — | — | — | — | — |

TABLE 3-continued

| Division | | Example | | | | | |
|---|---|---|---|---|---|---|---|
| | | 7 | 8 | 9 | 10 | 11 | 12 |
| weight) | A-6 | — | — | — | — | — | — |
| | A-7 | — | — | 24 | — | — | — |
| | A-8 | 24 | 24 | — | — | — | — |
| | A-9 | — | — | — | 24 | 24 | 20 |
| | A-10 | — | — | — | — | — | — |
| Styrene (parts by weight) | | 30 | 30 | 30 | 30 | 30 | 30 |
| Acrylonitrile (parts by weight) | | 10 | 10 | 10 | 10 | 10 | 10 |
| Molecular weight adjusting agent (parts by weight) | t-dodecyl mercaptan | 0.26 | 0.26 | 0.26 | 0.26 | 0.26 | 0.26 |
| | α-methyl styrene dimer | 0.14 | 0.14 | 0.14 | 0.14 | 0.14 | 0.14 |
| Polymerization conversion ratio | | 96 | 96 | 96 | 96 | 96 | 96 |
| Graft ratio | | 39 | 40 | 41 | 40 | 40 | 43 |
| Weight average molecular weight of shell | | 83,000 | 84,000 | 82,000 | 85,000 | 85,000 | 77,000 |
| Flow index | | 7.2 | 7.2 | 7.3 | 7.0 | 7.1 | 7.3 |
| Volatile organic compound remaining amount | | 800 | 810 | 790 | 820 | 790 | 750 |
| Surface protrusion number | | 4 | 5 | 4 | 4 | 5 | 4 |
| Falling sphere impact strength | | 3,850 | 3,950 | 4,000 | 3,800 | 3,950 | 4,200 |
| Notched izod impact strength | | 33 | 34 | 35 | 32 | 32 | 32 |

TABLE 4

| Division | | Comparative Example | | | |
|---|---|---|---|---|---|
| | | 1 | 2 | 3 | 4 |
| Large-size butadiene rubbery polymer (parts by weight) | A-1 | — | — | — | — |
| | A-2 | — | — | — | — |
| | A-3 | 60 | 60 | — | — |
| | A-4 | — | — | — | — |
| | A-5 | — | — | — | — |
| | A-6 | — | — | — | — |
| | A-7 | — | — | — | — |
| | A-8 | — | — | 60 | 60 |
| | A-9 | — | — | — | — |
| | A-10 | — | — | — | — |
| Styrene (parts by weight) | | 30 | 30 | 30 | 30 |
| Acrylonitrile (parts by weight) | | 10 | 10 | 10 | 10 |
| Molecular weight adjusting agent (parts by weight) | t-dodecyl mercaptan | 0.4 | — | 0.4 | — |
| | α-methyl styrene dimer | — | 0.4 | — | 0.4 |
| Polymerization conversion ratio | | 98 | 94 | 97.5 | 94 |
| Graft ratio | | 38 | 35 | 37 | 33 |
| Weight average molecular weight of shell | | 60,000 | 95,000 | 65,000 | 105,000 |
| Flow index | | 7.8 | 6.6 | 7.6 | 6.7 |
| Volatile organic compound remaining amount | | 1,200 | 1,300 | 1,350 | 1,150 |
| Surface protrusion number | | 25 | 28 | 30 | 35 |
| Falling sphere impact strength | | 3,700 | 3,500 | 3,900 | 3,600 |
| Notched izod impact strength | | 28 | 29 | 27 | 28 |

TABLE 5

|  | Division | Comparative Example 5 | Comparative Example 6 | Comparative Example 7 | Comparative Example 8 |
|---|---|---|---|---|---|
| Large-size butadiene rubbery polymer (parts by weight) | A-1 | 36 | — | — | — |
|  | A-2 | — | — | — | — |
|  | A-3 | — | — | 36 | 36 |
|  | A-4 | — | — | — | — |
|  | A-5 | — | 36 | — | — |
|  | A-6 | — | — | 24 | — |
|  | A-7 | — | — | — | — |
|  | A-8 | 24 | 24 | — | — |
|  | A-9 | — | — | — | — |
|  | A-10 | — | — | — | 24 |
| Styrene (parts by weight) | | 30 | 30 | 30 | 30 |
| Acrylonitrile (parts by weight) | | 10 | 10 | 10 | 10 |
| Molecular weight adjusting agent (parts by weight) | t-dodecyl mercaptan | 0.26 | 0.26 | 0.26 | 0.26 |
|  | α-methyl styrene dimer | 0.14 | 0.14 | 0.14 | 0.14 |
| Polymerization conversion ratio | | 96 | 95.5 | 96 | 96 |
| Graft ratio | | 35 | 34 | 34 | 35 |
| Weight average molecular weight of shell | | 83,000 | 92,000 | 85,000 | 83,000 |
| Flow index | | 6.8 | 6.5 | 6.7 | 6.8 |
| Volatile organic compound remaining amount | | 1,250 | 1,400 | 1,380 | 1,340 |
| Surface protrusion number | | 33 | 34 | 32 | 33 |
| Falling sphere impact strength | | 3,800 | 3,600 | 3,500 | 3,700 |
| Notched izod impact strength | | 29 | 27 | 26 | 27 |

Referring to Tables 2 to 5, it was found that the graft copolymers of Examples 1 to 12, prepared by the large-size butadiene rubbery polymers having particle size distribution of 0.35 to 0.4 and the large-size butadiene rubbery polymers having particle size distribution of 0.2 to 0.4 had the graft ratio of 37% or more and the weight average molecular weight of a shell of 75,000 g/mol or more. However, the graft copolymers of Comparative Examples 1 to 12 were found that if the graft ratio was 37% or more, the weight average molecular weight of a shell was 65,000 g/mol or less, and if the graft ratio was less than 37%, the weight average molecular weight was 75,000 g/mol or more. In addition, the thermoplastic resin compositions of Examples 1 to 12 were found to have small remaining amounts of volatile organic compounds, excellent characteristics of odor and small number of surface protrusions, and thus excellent surface characteristics. It was found that the falling sphere impact strength and notched izod impact strength were excellent and thus, mechanical properties were excellent.

Meanwhile, when comparing Examples 2 and 4, with Examples 5 and 6, it was found that the falling sphere impact strength was improved with the increase of the amount of t-dodecyl mercaptan.

In addition, when comparing Examples 1, 7 and 8, with Comparative Examples 5 and 6, it was found that Examples 1, 7 and 8, prepared using the large-size butadiene rubbery polymers having particle size distribution of 0.35 to 0.4 and the large-size butadiene rubbery polymers having particle size distribution of 0.23 showed markedly low remaining amount or volatile organic compounds, markedly small number of surface protrusions, excellent falling sphere impact strength and notched izod impact strength, and excellent mechanical properties when compared with Comparative Example 5, prepared using the large-size butadiene rubbery polymers having particle size distribution of 0.34 and the large-size butadiene rubbery polymers having particle size distribution of 0.23. In addition, it was found that Examples 1, 7 and 8 showed markedly low remaining amount or volatile organic compounds, markedly small number of surface protrusions, excellent falling sphere impact strength and notched izod impact strength, and excellent mechanical properties when compared with Comparative Example 6, prepared using the large-size butadiene rubbery polymers having particle size distribution of 0.41 and the large-size butadiene rubbery polymers having particle size distribution of 0.23.

In addition, when comparing Examples 1, 9 and 10, with Comparative Examples 7 and 8, it was found that Examples 1, 9 and 10, prepared using the large-size butadiene rubbery polymers having particle size distribution of 0.37 and the large-size butadiene rubbery polymers having particle size distribution of 0.2 to 0.3 showed markedly low remaining amount or volatile organic compounds, markedly small number of surface protrusions, excellent falling sphere impact strength and notched izod impact strength, and excellent mechanical properties when compared with Comparative Example 7, prepared using the large-size butadiene rubbery polymers having particle size distribution of 0.37 and the large-size butadiene rubbery polymers having particle size distribution of 0.19. In addition, it was found that Examples 1, 9 and 10 showed markedly low remaining amount or volatile organic compounds, markedly small number of surface protrusions, excellent falling sphere impact strength and notched izod impact strength, and excellent mechanical properties when compared with Comparative Example 8, prepared using the large-size butadiene rubbery polymers having particle size distribution of 0.37 and the large-size butadiene rubbery polymers having particle size distribution of 0.31.

Meanwhile, in case of Comparative Examples 1 to 4, prepared using only one type of large-size butadiene rubbery polymer, it was found that, when compared with the Examples, the remaining amount of volatile organic compounds was large and the characteristics of odor were not good, and since the number of surface protrusions was large, surface characteristics were not good, and the falling sphere impact strength and impact strength were degraded.

The invention claimed is:

1. A method for preparing a graft copolymer, the method comprising:
    polymerizing a first conjugated diene-based polymer, a second conjugated diene-based polymer, an aromatic vinyl-based monomer and a vinyl cyan-based monomer,
    wherein particle size distribution of the first conjugated diene-based polymer is 0.346 to 0.404, and
    particle size distribution of the second conjugated diene-based polymer is 0.196 to 0.304.

2. The method for preparing a graft copolymer according to claim 1, wherein average particle diameters of the first conjugated diene-based polymer and the second conjugated diene-based polymer are 0.2 to 0.4 μm, respectively.

3. The method for preparing a graft copolymer according to claim 1, wherein the particle size distribution of the first conjugated diene-based polymer is 0.35 to 0.4.

4. The method for preparing a graft copolymer according to claim 1, wherein the first and second conjugated diene-based polymers are respectively prepared by polymerizing a conjugated diene-based monomer to prepare a small-size conjugated diene-based polymer, and then, enlarging the small-size conjugated diene-based polymer.

5. The method for preparing a graft copolymer according to claim 4, wherein the small-size diene-based rubbery polymer has the gel content of 90% or more.

6. The method for preparing a graft copolymer according to claim 1, wherein the particle size distribution of the second conjugated diene-based polymer is 0.2 to 0.3.

7. The method for preparing a graft copolymer according to claim 1, wherein a weight ratio of the first conjugated diene-based polymer and the second conjugated diene-based polymer is 30:70 to 80:20.

8. The method for preparing a graft copolymer according to claim 1, wherein a weight ratio of the aromatic vinyl-based monomer and the vinyl cyan-based monomer is 80:20 to 65:35.

9. The method for preparing a graft copolymer according to claim 1, further adding a mercaptan-based compound and an aromatic vinyl-based dimer during polymerizing.

10. The method for preparing a graft copolymer according to claim 9, wherein the mercaptan-based compound and the aromatic vinyl-based dimer are added in a weight ratio of 60:40 to 70:30.

11. A graft copolymer prepared by the preparation method according to claim 1, and having a graft ratio of 37% or more and a weight average molecular weight of a shell of 75,000 g/mol or more.

12. A thermoplastic resin molded article manufactured from a thermoplastic resin composition comprising:
    the graft copolymer according to claim 11; and
    a copolymer comprising a unit derived from an aromatic vinyl-based monomer and a unit derived from a vinyl cyan-based monomer,
    wherein a remaining amount of volatile organic compounds is 1,000 ppm or less.

* * * * *